(12) United States Patent
Rao

(10) Patent No.: US 9,804,419 B2
(45) Date of Patent: Oct. 31, 2017

(54) LIGHT-FILTERING OPTICAL ACCESSORY

(71) Applicant: RAO INNOVATIONS LLC, Pacific Palisades, CA (US)

(72) Inventor: Vijendra Rao, Pacific Palisades, CA (US)

(73) Assignee: RAO INNOVATIONS LLC, Pacific Palisades, CA (US)

( * ) Notice: Subject to any disclaimer, the term of this patent is extended or adjusted under 35 U.S.C. 154(b) by 0 days.

(21) Appl. No.: 15/356,304

(22) Filed: Nov. 18, 2016

(65) Prior Publication Data

US 2017/0146826 A1 May 25, 2017

Related U.S. Application Data

(60) Provisional application No. 62/258,120, filed on Nov. 20, 2015, provisional application No. 62/355,519, filed on Jun. 28, 2016.

(51) Int. Cl.
| | |
|---|---|
| *G02C 7/12* | (2006.01) |
| *G02C 7/10* | (2006.01) |
| *G02C 7/16* | (2006.01) |
| *G02C 5/22* | (2006.01) |

(52) U.S. Cl.
CPC .............. *G02C 7/101* (2013.01); *G02C 5/22* (2013.01); *G02C 7/104* (2013.01); *G02C 7/16* (2013.01)

(58) Field of Classification Search
CPC . G02C 7/101; G02C 7/12; G02C 5/14; G02C 7/108; G02C 7/16
USPC ............. 351/44, 49, 158, 41; 349/13, 15, 16
See application file for complete search history.

(56) References Cited

U.S. PATENT DOCUMENTS 5,184,156 A * 2/1993 Black ..................... G02C 7/101
351/158

OTHER PUBLICATIONS

AlphaMicron, "Wearable Tech," available at http://alphamicron.com/wearable-techi, Nov. 2016, 2 pgs.
CTRL Eyewear, "CTRL Eyewear Online Shop," available at http://www.ctrkeyewear-shop.coml, Nov. 2016, 2 pgs.
(Continued)

*Primary Examiner* — Hung Dang
(74) *Attorney, Agent, or Firm* — Martin & Ferraro, LLP

(57) ABSTRACT

A method and system is provided for controlling the intensity and wavelength of light that is perceived by a user to achieve optimal contrasts when viewing medical images. A medical image reviewing system may include at least one medical image displaying monitor and a light-filtering optical eyewear. The light-filtering optical eyewear may include an eyewear frame, the eyewear frame including a first temple, a second temple, and a lens frame, the lens frame being centrally connected between the first temple and the second temple. The light-filtering optical eyewear may further include a first ambient light shield, the first ambient light shield being connected along the first temple. The light-filtering optical eyewear may further include a second ambient light shield, the second ambient light shield being connected along the second temple. The light-filtering optical eyewear may further include a light-filtering lens assembly configured to optimize the contrasts of the medical images being viewed by the user and maintain activation of rods in the eyes of the user for low light level viewing by the user.

16 Claims, 7 Drawing Sheets

(56) References Cited

OTHER PUBLICATIONS

Greenwood, "Sunglasses Developed with Adjustable Shade and Color," available at http://www.photonios.com/Article.aspx?AID=29481, May 2007, 3 pgs.
Kohrnura et al., "Effect of Yellow-Tinted Lenses on Visual Attributes Related to Sports Activities," Journal of Human Kinetics, vol. 36/2013, 27-36, Mar. 2013, 10 pgs.
LC-TEC, "FOS series," LC-Tec Displays AB, FOS series model overview (1602), Feb. 2016, 4 pgs.
LC-TEC, "PolarView—ND(14)," LC-Tec Displays AB, PolarView—ND(14) Product preview (1607), Jul. 2016, 1 pg.
Skugga Eyewear, "Dynamic Sunglasses," available at http://skuggaeyewear.com/, Nov. 2016, 8 pgs.
SmartCling Technology, "Smart Tint Technical Data Sheet," Jan. 2016, 1 pg.
Liras Bole, "10 blue light filters to relieve computer eye strain, help you sleep better, etc." available at https://glarminy.com/2015/07/30/10-blue-light-filters-to-relieve-computer-eye-strain-help-you-sleep-better-etc/, Jul. 30, 2015, 36 pgs.

\* cited by examiner

LIGHT-FILTERING OPTICAL ACCESSORY

This application claims priority to U.S. Provisional Patent Application No. 62/258,120 filed Nov. 20, 2015 and 62/355,519 filed Jun. 28, 2016; all of which are incorporated by reference herein in their entirety.

FIELD OF THE INVENTION

The present invention relates generally to an optical device that is worn by a person while diagnosing medical images produced through radiology in order to control the intensity and wavelength of light which is transmitted in order to achieve optimal contrasts when viewing medical images.

BACKGROUND OF THE INVENTION

Ideal conditions for viewing medical images are hard to come by and have led to the development of rooms designed explicitly for that purpose. These dark rooms provide several advantages, one of which is optimal contrast for viewing certain types of images, for example, medical imaging produced through radiology. Diagnostic medical images are typically obtained by utilizing multiple technologies, including Ultrasound, X-ray, Computer Tomography (CT scan), Magnetic Resonance Tomography (MRI), Nuclear medicine, and Positron Emission Tomography (PET). The obtained images are in DICOM (Digital Imaging and Communications in Medicine) format and are viewed utilizing a PACS (Picture Archiving and Communication System) on corresponding diagnostic monitors. For optimal viewing of these images on said diagnostic monitors, it is desirable to optimize contrast in order to better detect medically significant features.

In typical reading stations utilized by medical professionals, there are multiple monitors that allow the medical professional to review the entire series of images for a particular exam. During review, the medical professional also utilizes all relevant prior exams and cross modality images to aid in interpretation; these prior exams and cross modality images are displayed on additional monitors. Further, there are typically monitors provided for reviewing patient data from clinical notes and pathology reports to again assist in interpretation. The ability to easily see and review all this information is very beneficial, but one drawback is that the multi-monitor setup increases ambient light which in turn diminishes visual acuity. It is desirable to address the issue of diminished visual acuity while maintaining the advantages of a multi-monitor setup.

The present invention assists with such viewing by allowing for contrast to be optimized via filtering of light. Both color filters and transmittance filters can be used to control the color of the image and brightness of the surrounding area. This allows for an optimal level of contrast to be achieved for any given image. Filtering mechanisms may be of an active/smart type, a passive type, or a combination thereof. Furthermore, the present invention is applicable in a variety of fields beyond medical imaging.

While devices exist which can serve similar purposes, they are lacking in one or more areas. Compared to these existing devices, the present invention has several advantages. For one, the present invention is compact and ergonomic, allowing it to be comfortably worn over a long duration (e.g., several hours). The construction of the present invention also does not directly contact radiological images. Other advantages include an unrestricted field of view, the option for both active and passive light filtration, reduction of ambient light, and overall improved visual acuity and optimal image contrast.

The present invention helps maintain activation of rods in the eye for low light level viewing by filtering light. This is advantageous as it takes a long time for the eye to activate rods in place of cones, time which is saved by the present invention. The present invention's focus on optimizing visual acuity and contrast is beneficial as it accentuates the sensitivity of eyes to spectra.

SUMMARY OF THE INVENTION

The present invention in an embodiment contemplates a light-filtering optical eyewear for controlling the intensity and wavelength of light that is perceived by a user to achieve optimal contrasts when viewing medical images, the light-filtering optical eyewear includes an eyewear frame, the eyewear frame including a first temple, a second temple, and a lens frame, the lens frame being centrally connected between the first temple and the second temple; a first ambient light shield, the first ambient light shield being connected along the first temple; a second ambient light shield, the second ambient light shield being connected along the second temple; a light-filtering lens assembly configured to optimize the contrasts of the medical images being viewed by the user and maintain activation of rods in the eyes of the user for low light level viewing by the user, the light-filtering lens assembly including a voltage-driven display, the voltage-driven display being a liquid crystal light filter and mounted onto the eyewear frame and being configured to adjust a total transmittance of light and a color of the voltage-driven display based on a voltage provided to the voltage-driven display, when the user is in a dark room, the total transmittance of light of the voltage-driven display being adjustable to be within the range of approximately 85-95% transmittance of light and the color of the voltage-driven display being yellow, and when the user is in a lighted area or in daylight, the total transmittance of light of the voltage-driven display being adjustable to be within the range of approximately 40-60% transmittance of light and the color of the voltage-driven display being red; an electrical system, the electrical system being electrically coupled to the light-filtering lens assembly, the electrical system includes a processor; a power source; and a potentiometer, the potentiometer being configured to manually adjust the voltage provided to the voltage-driven display; and at least one ambient light sensor, the at least one ambient light sensor being electrically coupled to the electrical system and being configured to automatically adjust the voltage provided to the voltage-driven display.

The present invention in another embodiment contemplates a medical image reviewing system for controlling the intensity and wavelength of light that is perceived by a user to achieve optimal contrasts when viewing medical images, the medical image reviewing system includes at least one medical image displaying monitor and a light-filtering optical eyewear. The light-filtering optical eyewear includes an eyewear frame, the eyewear frame including a first temple, a second temple, and a lens frame, the lens frame being centrally connected between the first temple and the second temple; a first ambient light shield, the first ambient light shield being connected along the first temple; a second ambient light shield, the second ambient light shield being connected along the second temple; a light-filtering lens assembly configured to optimize the contrasts of the medical images being viewed by the user and maintain activation of rods in the eyes of the user for low light level viewing by the user, the light-filtering lens assembly including a voltage-driven display, the voltage-driven display being a liquid crystal light filter and mounted onto the eyewear frame and being configured to adjust a total transmittance of light and a color of the voltage-driven display based on a voltage provided to the voltage-driven display, when the user is in a dark room, the total transmittance of light of the voltage-driven display being adjustable to be within the range of approximately 85-95% transmittance of light and the color of the voltage-driven display being yellow, and when the user is in a lighted area or in daylight, the total transmittance of light of the voltage-driven display being adjustable to be within the range of approximately 40-60% transmittance of light and the color of the voltage-driven display being red; an electrical system, the electrical system being electrically coupled to the light-filtering lens assembly, the electrical system includes a processor; a power source; and a potentiometer, the potentiometer being configured to manually adjust the voltage provided to the voltage-driven display; and at least one ambient light sensor, the at least one ambient light sensor being electrically coupled to the electrical system and being configured to automatically adjust the voltage provided to the voltage-driven display.

In an alternative embodiment, the light-filtering optical eyewear includes the power source being housed in the eyewear frame and the potentiometer being mounted to the eyewear frame; the lens frame includes a first rim, a second rim, and a bridge, the first rim being connected between the first temple and the bridge, the second rim being connected between the second temple and the bridge, and the bridge being connected between the first rim and the second rim; the voltage-driven display includes a first display and a second display, the first display being connected to the first rim and the second display being connected to the second rim; a voltage applied to the first display of the voltage-driven display is different from a voltage applied to the second display of the voltage-driven display; the first temple being hingedly connected to the first rim and the second temple being hingedly connected to the second rim; the first ambient light shield being positioned adjacent to the first rim and the second ambient light shield being positioned adjacent to the second rim; the light-filtering optical eyewear further including a wireless module, the wireless module being housed within the eyewear frame and being electronically coupled to the potentiometer; the light-filtering optical eyewear further including a passive filter layer, the passive filter layer being joined to the voltage-driven display.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate preferred embodiments of the invention. Together with the description, they serve to explain the objects, advantages and principles of the invention. In the drawings.

DETAILED DESCRIPTION

Figure 1:
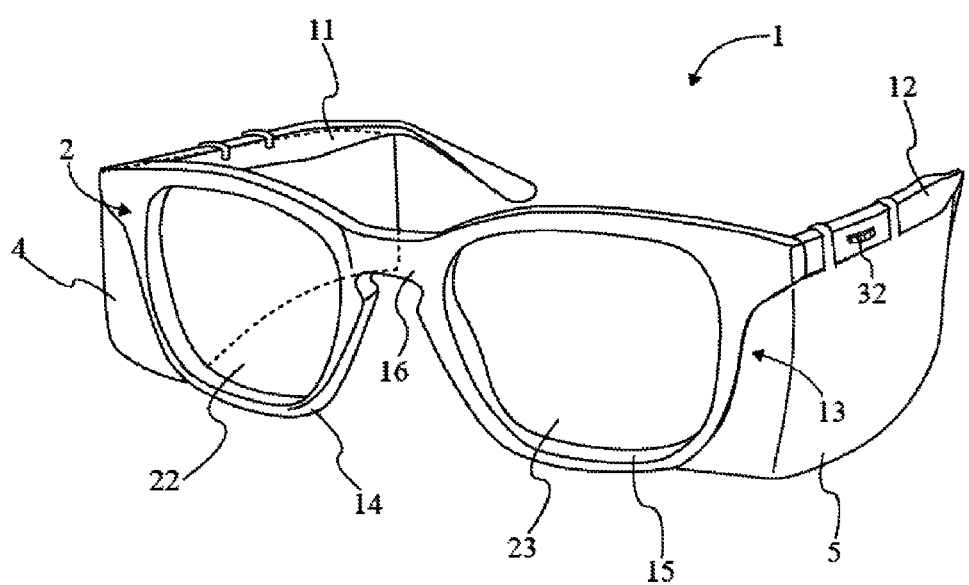
FIG. 1 illustrates a perspective view of an embodiment of an eyewear frame that utilizes a light-filtering lens assembly.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For example, features illustrated or described as part of one embodiment can be used with another embodiment to yield a still further embodiment. Thus, it is intended that the present subject matter cover such modifications and variations as come within the scope of the appended claims and their equivalents.

In the detailed description of embodiments that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

All illustrations of the drawings are for the purpose of describing selected versions of the present invention and are not intended to limit the scope of the present invention.

Figure 2:
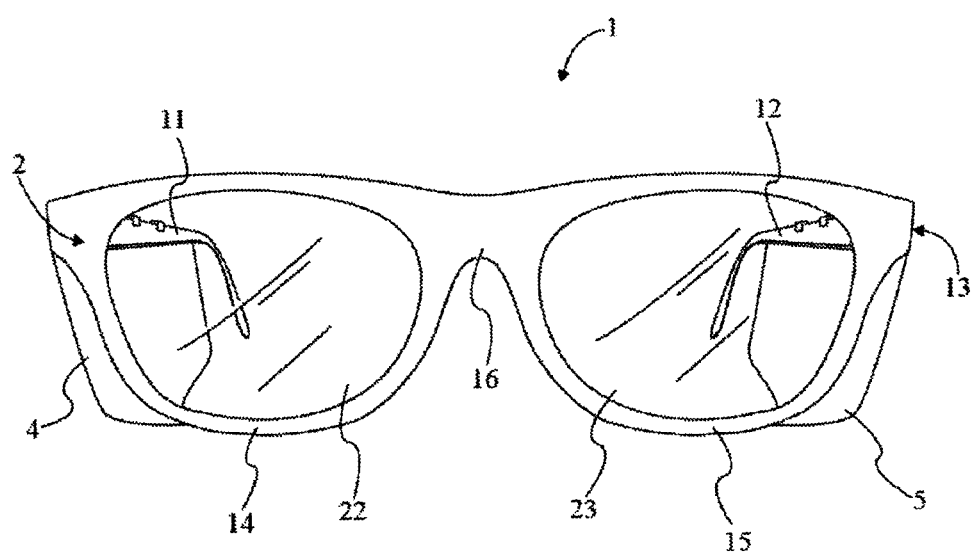
FIG. 2 illustrates a front view of the embodiment of the eyewear frame that utilizes the light-filtering lens assembly.
Figure 3:
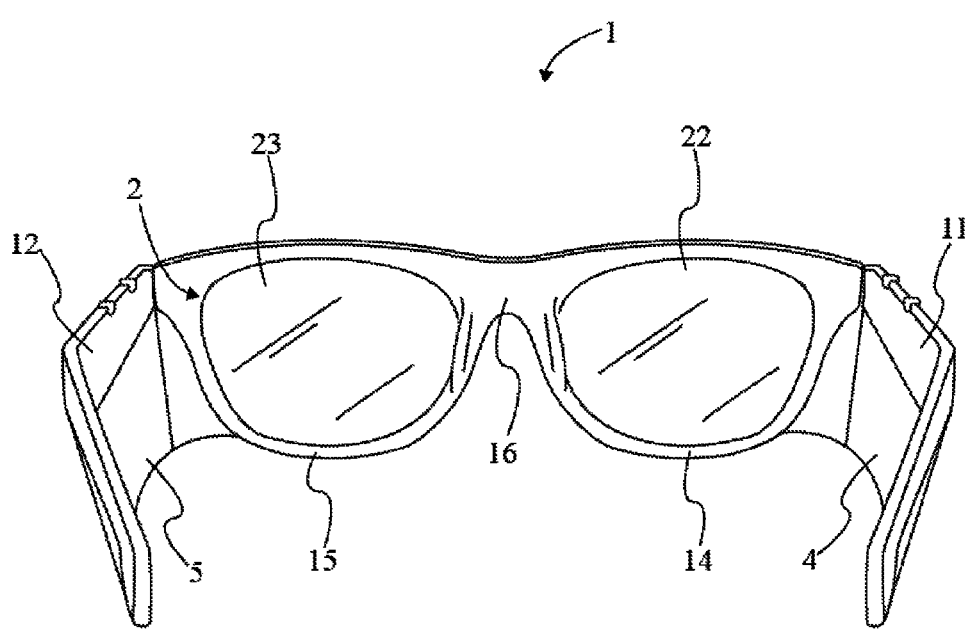
FIG. 3 illustrates a rear view of the embodiment of the eyewear frame that utilizes the light-filtering lens assembly.
Figure 4:
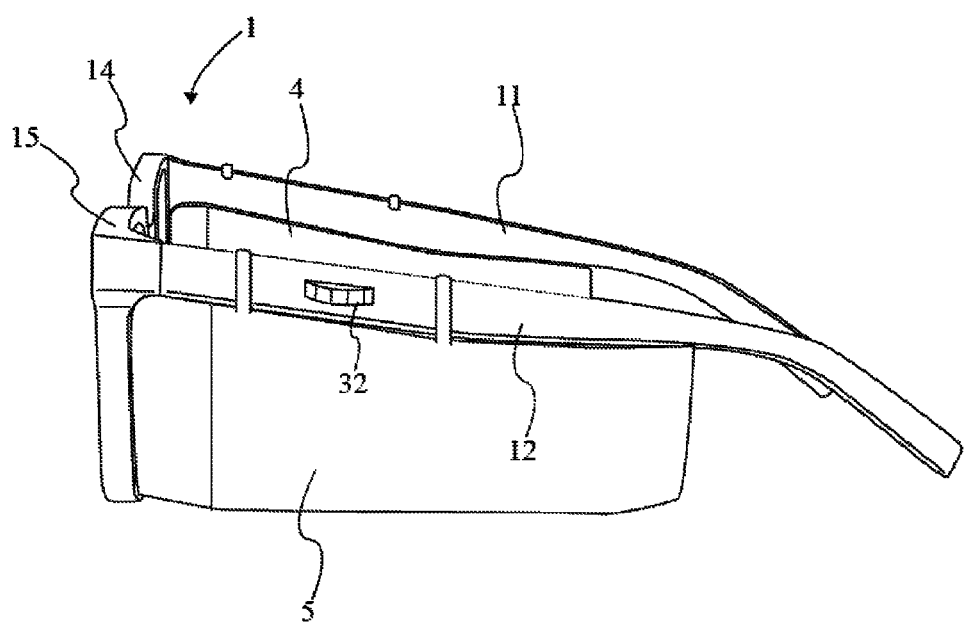
FIG. 4 illustrates a right side view of the embodiment of the eyewear frame that utilizes the light-filtering lens assembly.
Figure 5:
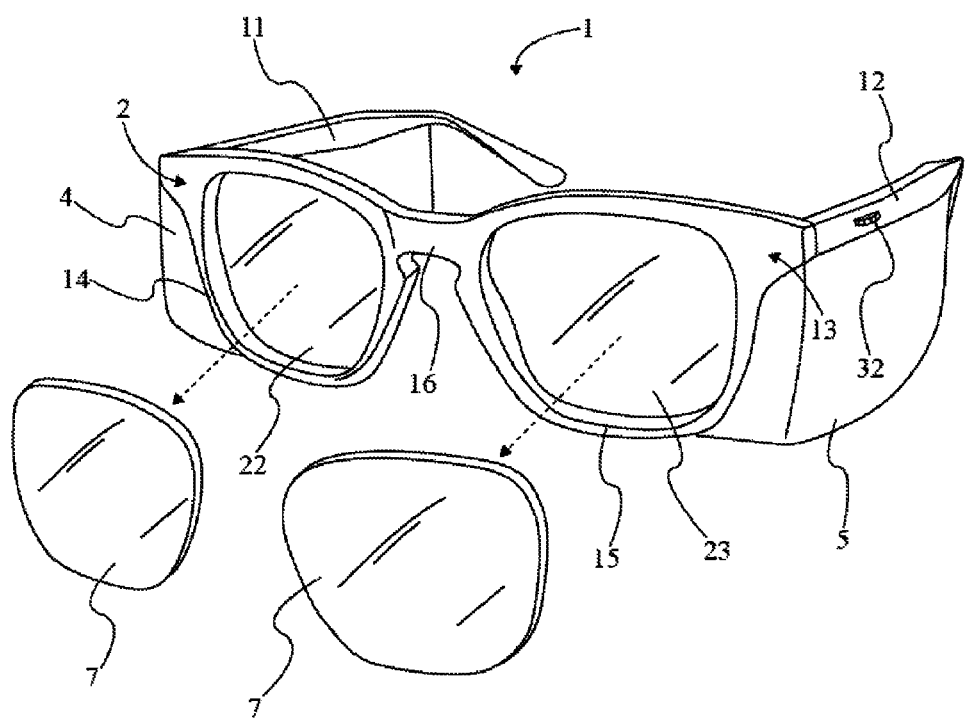
FIG. 5 illustrates a perspective view of another embodiment of the eyewear frame with an attachable filter layer.
Figure 6:
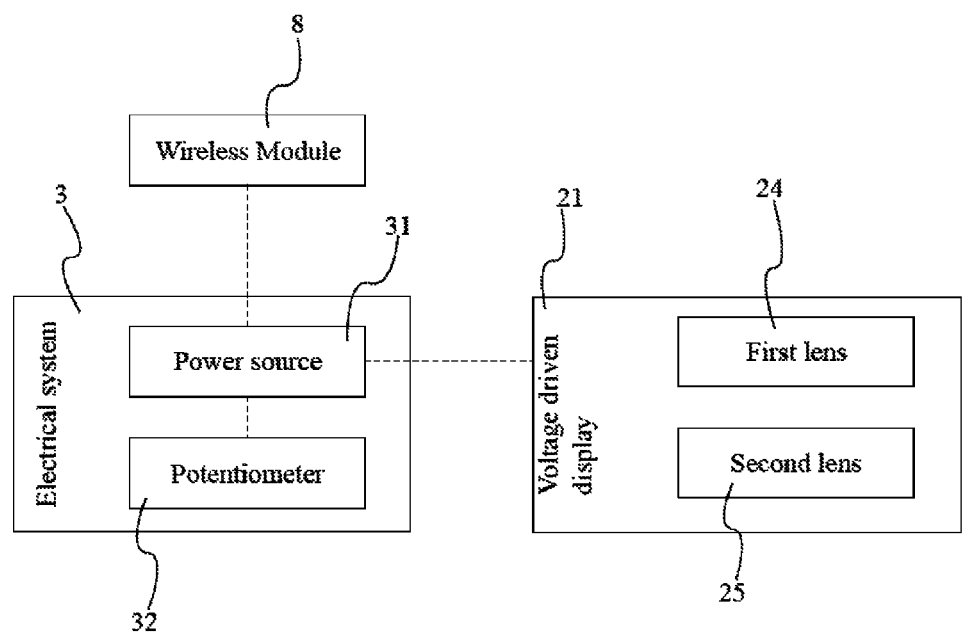
FIG. 6 illustrates a diagram of electrical connections and a light-filtering circuit of the embodiment of the eyewear frame.
Figure 7:
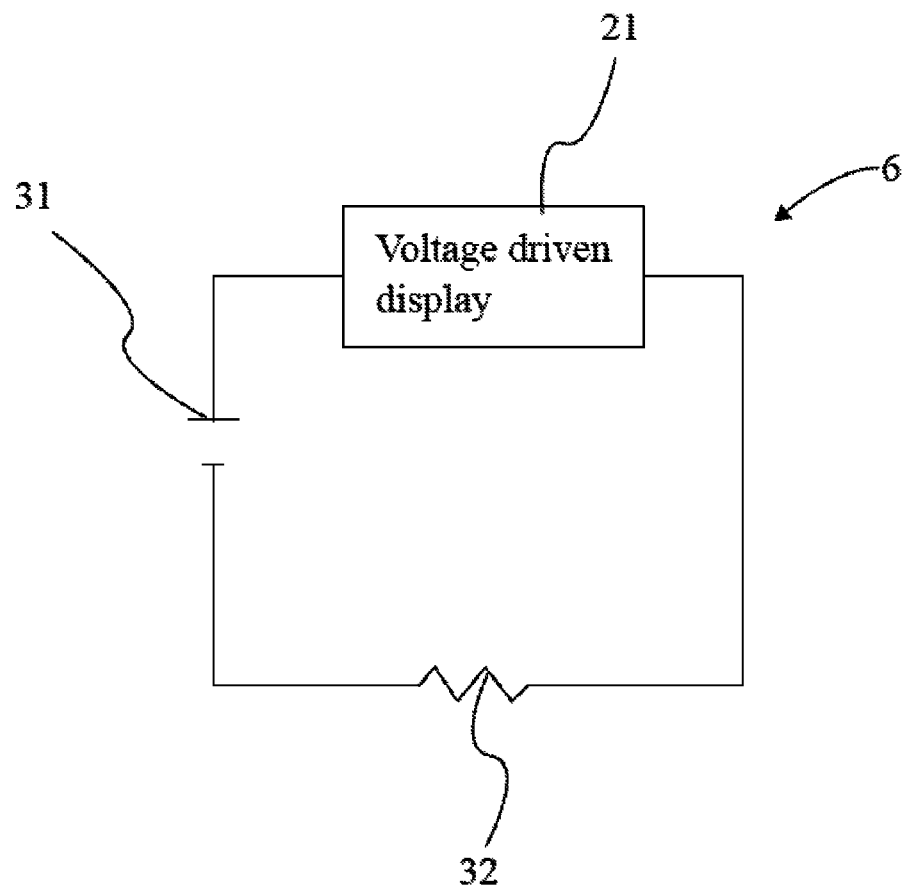
FIG. 7 illustrates a simplified circuit diagram of the light-filtering circuit of the embodiment of the eyewear frame.

The present invention is a light-filtering optical accessory that can be used in a variety of applications. The application primarily describes the present invention as being used for viewing of radiological images, but this does not preclude the use of the present invention in other applications, examples of which include sports and photography. The present invention is illustrated via FIG. 1-FIG. 7.

The present invention comprises an eyewear frame 1, a light-filtering lens assembly 2, an electrical system 3, a first ambient light shield 4, and a second ambient light shield 5. The eyewear frame 1 allows for the present invention to be used hands free, supported by a person's head and ears. The light-filtering lens assembly 2 serves to filter incoming light, providing optimal viewing conditions for viewing radiological images. The electrical system 3 provides the necessary power (e.g., an 8V power supply) for active light filtering mechanisms, as well as accessory components as later described. The first ambient light shield 4 and the second ambient light shield 5 help to increase contrast of viewed images by blocking peripherally viewed light. The first ambient light shield 4 and the second ambient light shield 5 may also include approximately greater than or equal to 90% tint. The basic configuration of the present invention, including first ambient light shield 4 and the second ambient light shield 5, is depicted in FIG. 1-FIG. 5.

These components create an enhanced viewing experience by increasing the contrast of images (including both color and grayscale images) viewed through the light-filtering lens assembly 2. The light-filtering lens assembly 2 helps to control contrast as it allows images to be viewed through different color filters. For example, the light-filtering lens assembly 2, the first ambient light shield 4, and the second ambient light shield 5 can be set to a different tint of yellow, orange, or red (or a combination of these tints) in order to enhance black and white contrast. Additionally, a dark red tint can be used to reduce eye strain, as caused by acute change of spectra. An example of acute change of spectra is quickly moving between dark areas and bright areas, such as a radiologist might do when entering and exiting a dark room. Too, this has the benefit of keeping the eye acclimatized to low light levels, which is optimal for reviewing diagnostic medical images.

Another benefit of such a color filter is that the color yellow accentuates grayscale images. Since diagnostic medical images are provided in grayscale, a yellow filter optimizes contrast. The optimized contrast can help a medical professional see relevant details that might have otherwise been missed in normal viewing conditions. It is noted that the present invention is not restricted to yellow, orange, or red filters; any color combination of tints for a filter is allowed by the present invention. Indeed, the present invention facilitates easy and quick changes to tint colors thanks to the active filter mechanism of the preferred embodiment.

Describing the components of the present invention in more detail, the eyewear frame 1 comprises a first temple 11, a second temple 12, and a lens frame 13. The lens frame 13 further comprises a first rim 14, a second rim 15, and a bridge 16. The lens frame 13 is connected between the first temple 11 and the second temple 12, while the bridge 16 provides additional support by resting against a user's nose. The first temple 11 and the second temple 12, meanwhile, are generally parallel with each other and perpendicular to a plane of the lens frame 13. Resultantly, the first temple 11 and the second temple 12 can rest over a user's ears, supporting the present invention in a desired position.

The light-filtering lens assembly 2 is mounted into the eyewear frame 1, such that the light-filtering lens assembly 2 is supported directly in front of a user's field of view. Preferably, to allow for an easily adjusted filter, the light-filtering lens assembly 2 comprises a voltage-driven display 21. By increasing or decreasing the amount of voltage being supplied to the voltage-driven display 21, the properties of the light-filtering lens assembly 2 can be quickly and easily adjusted as needed. For example, the voltage-driven display 21 may adjust the amount of transmittance of light and/or the color of the voltage-driven display 21. The voltage-driven display 21, the first ambient light shield 4, and the second ambient light shield 5 may be electrochromic, photochromic, thermochromic, a suspended particle, a micro-blind, and/or a polymer dispersed liquid crystal light filter.

In the polymer dispersed liquid crystal light filter, liquid crystals may be dissolved or dispersed in a liquid polymer that is then followed by a solidification or curing process of the liquid polymer. The thickness of the liquid polymer and the liquid crystals may be 0.06 micrometers. The liquid polymer and liquid crystals may be placed between two layers or glass or plastic (e.g., a transparent polycarbonate material with a thickness of 0.1 mm) that may include a thin layer of a transparent, conductive material (e.g., an In—Sn oxide). The polymer may then be cured, forming a "sandwich" structure of the smart display, which may effectively act like a capacitor. Electrodes from a power supply may be attached to the smart display to apply a voltage to the liquid crystal light filter.

When a voltage is not applied to the smart display, the liquid crystals may be randomly arranged resulting in the scattering of light as light passes through the smart display. This scattering of light may decrease the transmittance of light in the smart display. When a voltage is applied to the smart display, an electric field may be created in the smart display that aligns the liquid crystals, thereby allowing light to pass through and being minimally scattered. The degree of transparency may be controlled by the amount of voltage applied to the smart display. For example, when less voltage is applied to the smart display, the smart display will be less transparent because less of the liquid crystals may be aligned. When more voltage is applied to the smart display, the smart display will be more transparent because more of the liquid crystals may be aligned.

To manage the voltage-driven display 21, as well as manage the supplied voltage, the electrical system 3 comprise a power source 31 and a potentiometer 32. The power source 31 provides energy for operation of the present invention, while the potentiometer 32 allows for voltage to be controlled in order to adjust the filtering properties of the voltage-driven display 21. The power source 31, the potentiometer 32, and the voltage-driven display 21 are thus connected into a light-filtering circuit 6, serving as an active filter system for the present invention. The electrical connections and light-filtering circuit 6 are visualized in FIG. 6 and FIG. 7. While the described embodiment of the present invention utilizes the voltage-driven display 21 as an active filter mechanism, other active filter mechanisms could be used in place of or alongside the voltage-driven display 21 while remaining within the scope of the present invention.

The first ambient light shield 4 and the second ambient light shield 5 obscure a user's peripheral vision and prevent ambient light from affecting a user's eyesight. This effectively helps to further optimize contrast of viewed radiological images. This accentuates the optimized contrast created by using specific color filters, e.g., using a dark red filter to view grayscale images as earlier described.

Optionally, to further facilitate maintenance of visual acuity during transitions between dark areas and lighted areas (as with the earlier provided radiologist example), an expanded light shield can be incorporated into the present invention. The expanded light shield comprises an upper visor and a lower visor that are perimetrically connected along the top and bottom edges of the lens frame 13. The upper visor and lower visor are contoured to comfortably rest against a person's face, similar to how the first ambient light shield 4 and the second ambient light shield 5 are ergonomically adapted to fit the sides of a person's head. Resultantly, the visors in combination with the first ambient light shield 4 and the second ambient light shield 5 serve to completely seal the internal area of the present invention; the only entry of light is through a first lens 24 and a second lens 25 (e.g., a first display 22 and a second display 23) of the present invention. The full assembly of light shields and visors also allows for the present invention to be worn over regular eyewear (e.g., corrective spectacles) when sized appropriately.

The power source 31, preferably, is housed within the eyewear frame 1, though in other embodiments the power source 31 may be externally mounted to the eyewear frame 1. The potentiometer 32 is mounted into the eyewear frame 1; this allows a user to access the potentiometer 32 and adjust the power source 31 to the voltage-driven display 21 as desired. Ideally, the potentiometer 32 is mounted to one of the two temples 11, 12, or along one of the first ambient light shield 4 and the second ambient light shield 5. While the potentiometer 32 could be mounted at a front section of the present invention, next to the light-filtering lens assembly 2, such positioning could potentially interfere with a user's field of vision. Another possibility is the use of a wireless device that can remotely control the potentiometer 32, as later detailed.

While the present invention has thus far been described as primarily utilizing an active filter mechanism, passive filter mechanisms are also possible. In an embodiment making use of such, the present invention comprises a passive filter layer 7. The passive filter layer 7 is adhered across the voltage-driven display 21, creating a desired filter (e.g., color, tint, or both) that overlays a lens. The specific implementation of the passive filter layer 7 is not restricted by the present invention; for example, the passive filter layer 7 may be a thin film that is applied to a lens of the present invention. Alternatively, the passive filter layer 7 could be a coating which is spread across a lens of the present invention.

One example of implementation of the passive filter layer 7 is a photochromic polymer layer, as utilized in photochromic lenses. An application of a photochromic polymer layer allows the lenses to automatically darken (tint) when exposed to light. This tint requires no action on the part of the user, only requiring the stimulus of light to occur. In this manner, visual acuity can be optimized even when exposed to bright light, as the passive filter layer will automatically darken to accommodate for the change in lighting conditions.

It is noted that the photochromic layer can instead be integrated into the lens construction, rather than being an adhered layer. The end result remains the same, that being a passive filtering mechanism for optimizing visual acuity. Beyond the example of photochromic technology, any passive solutions that help to optimize visual acuity are compatible with the present invention.

It is noted that the first ambient light shield 4 and the second ambient light shield 5 are also considered passive in nature. The passive filter layer 7, however, is intended to allow light through in a desired color spectrum to allow a user to view images through the passive filter layer 7, whereas the first ambient light shield 4 and the second ambient light shield 5 are meant for completely obscuring light. In short, the first ambient light shield 4 and the second ambient light shield 5 are opaque while the passive filter layer 7 is transparent. Ultimately, both serve to control the amount of light that reaches a user's eyes with the goal of optimizing contrast in a viewed image.

Preferably, as illustrated, the eyewear frame 1 is of a two-lens configuration. That is, the eyewear frame 1 further comprises the first rim 14 and the second rim 15, while the voltage-driven display 21 comprises the first display 22 and the second display 23. The first rim 14 is connected between the first temple 11 and the bridge 16 while the second rim 15 is connected between the second temple 12 and the bridge 16. In other words, the first rim 14 is adjacently connected to one end of the bridge 16, while the second rim 15 is adjacently connected to an opposite end of the bridge 16. The first display 22 is connected into the first rim 14, while the second display 23 is connected into the second rim 15. This culminates in two independent displays being provided, one for each eye of a user. The transmittance of light for the two independent displays may also be adjusted separately to provide the best contrast resolution for the user.

Alternatively, the present invention could be provided in a visor-style embodiment, in which a single unbroken lens extends across the entire front of the eyewear frame 1. This visor-style embodiment has a single rim in which the individual lens is secured, with the bridge forming a recessed section in the rim. Effectively, in this alternative embodiment, the first display 22 and the second display 23 are joined into a unitary lens for both eyes. Otherwise, this embodiment is equivalent to the described preferred embodiment.

Further, the first temple 11 and the second temple 12 are preferably hingedly connected, such that they may be folded between an open configuration and a closed configuration. The closed configuration is more compact than the open configuration and reduces the amount of space required for the present invention when it is not actively being used.

Another possibility for the present invention is the integration of a wireless module 8. The wireless module 8 is housed within the eyewear frame 1 and is electronically connected to the potentiometer 32. The wireless module 8 allows for remote adjustments of the voltage-driven display 21. For example, instructions can be remotely communicated through Bluetooth, infrared, WiFi, or similar technologies. Resultantly, radiology input devices such as eye tracking, gesture controls, and mouse and keyboard functions can be used to remotely control the present invention via the wireless module 8.

Also possible is the addition of ambient light sensors; these ambient light sensors are mounted to the eyewear frame 1 and electronically connected to the voltage-driven display 21. The ambient light sensors may also be mounted on the first temple 11, the second temple 12, the first rim 14, the second rim 15, and/or the bridge 16 of the eyewear frame 1. The ambient light sensors may include one or a plurality of ambient light sensors that coordinate together to assist in adjusting the filter properties of the present invention. As the amount of ambient light changes (e.g., as would occur when moving from a dark room to an outside location), the ambient light sensors automatically adjust the filter properties of the present invention by raising or lowering the voltage provided to the voltage-driven display 21, thereby allowing the user's eyesight to be less affected by the sudden change in brightness from the dark room to the outside location and vice versa. The eyewear frame 1 may utilize the potentiometer 32, the ambient light sensors, or both to adjust the voltage provided to the voltage-driven display 21.

The time period for the user's eyesight to adjust from a lighted area to a dark area is significantly larger than the time period for the user's eyesight to adjust from the dark area to the lighted area. To decrease the amount of time it takes for the user's eyesight to adjust to the surrounding, new ambient light, the eyewear frame 1 of the present invention utilizes the ambient light sensors to sense a change in brightness of the surrounding area to automatically adjust the amount of light perceived by the user. The eyewear frame 1 may also include a processor and memory to process information provided by the ambient light sensors to adjust light transmittance and the voltage-driven display 21 accordingly.

Whether the eyewear frame 1 utilizes the active filtering mechanism and/or the passive filtering mechanism, the eyewear frame 1 may allow for optimal transmittance of light when the user is in the dark room reviewing medical images and approximately 40-60% transmittance of light when the user is in the lighted area/daylight. The user may also select the percentage of transmittance of light of the eyewear frame 1 when the user is in the lighted area. For example, if the user selects 10% transmittance of light and utilizes a red-colored, passive filter layer 7 that allows for 40% transmittance of light, the voltage-driven display 21 may inhibit the remainder 30% transmittance of light to allow for the user selected 10% transmittance of light.

Another example of the present invention for when the user is in the dark room reviewing medical images includes utilizing a yellow-colored, passive filter layer 7. If the eyewear frame 1 utilizes the yellow-colored, passive filter layer 7 and a clear voltage-driven display 21, the yellow-colored, passive filter layer 7 may include a 5-15% light yellow, variable tint (85-95% transmittance of light) and the clear voltage-driven display 21 may further decrease the transmittance of light to the percentage selected by the user. If the eyewear frame 1 utilizes the yellow-colored, passive filter layer 7 and not the clear voltage-driven display 21, the yellow-colored, passive filter layer 7 may include approximately a 10% light yellow tint.

An example of the present invention for when the user is in the lighted area/daylight and not reviewing medical images includes utilizing a red-colored, passive filter layer 7. If the eyewear frame 1 utilizes the red-colored, passive filter layer 7 and a clear voltage-driven display 21, the red-colored, passive filter layer 7 may include a 40-60% red variable tint (40-60% transmittance of light) and the clear voltage-driven display 21 may further decrease the transmittance of light to the percentage selected by the user. If the eyewear frame 1 utilizes the red-colored, passive filter layer 7 and not the clear voltage-driven display 21, the red-colored, passive filter layer 7 may include approximately a 60% red tint. It is noted that the present invention is not restricted to yellow, orange, or red filters; any color combination of tints for a filter is allowed by the present invention.

In an alternative example of the present invention, the voltage-driven display 21 may utilize and switch between multiple colors without including a colored passive filter layer 7. For example, a colored voltage-driven display 21 may be yellow when the user is in the dark room reviewing medical images and then switched to a red color when the user is in the lighted area/daylight. The percentage of tint of the colors may also be adjusted by the user to optimally view medical images in the dark room and to maintain activation of rods in the eye for low light level viewing. The colored voltage-driven display 21 may also include a colored passive filter layer 7, thereby utilizing two different colors or two of the same colors.

Overall, the present invention provides a wearable accessory that helps control visible light to optimize contrast when viewing images. Though the preferred embodiment describes a combination of active and passive filtering mechanisms, different embodiments may omit either filtering mechanism. For example, in the most basic version of the active filtering mechanism, the first ambient light shield 4, the second ambient light shield 5, and/or the passive filter layer 7, may be omitted. Alternatively, in a simpler version, the voltage driven-display 21 is entirely replaced by the passive filter layer 7.

The present invention can be provided as a standalone product or may be used to retrofit existing eyewear devices. For example, regular spectacles could be converted by adhering the passive filter layer 7 to the normal lenses and attaching the first ambient light shield 4 and the second ambient light shield 5 to each temple 11, 12. The normal lenses of the regular spectacles may also be prescription lenses that are tailored to the individual user.

Several ergonomic features can be incorporated into the present invention. For example, just as the first temple 11, the second temple 12, and the bridge 16 are ideally configured to comfortably rest over a user's ears and nose, the first ambient light shield 4 and the second ambient light shield 5 can be contoured to match the natural shape of a person's head. Indeed, the first ambient light shield 4 and the second ambient light shield 5 can be customized to match a specific person's individual needs and facial contours. Likewise, the distance between a person's eyes and the light-filtering lens assembly 2 can be adjusted according to personal needs.

While the present invention describes both active and passive filters for use with optical devices, it makes no restriction to the type of filter. Filters can be provided for any desired wavelength of light (i.e., color) and transmittance (i.e., how much light is allowed through). Multiple filters can be provided to allow a user greater choice in selecting an ideal filter for any given application.

Although the invention has been explained in relation to its preferred embodiment, it is to be understood that many other possible modifications and variations can be made without departing from the spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A light-filtering optical eyewear for controlling the intensity and wavelength of light that is perceived by a user to achieve optimal contrasts when viewing medical images, the light-filtering optical eyewear comprising:
    an eyewear frame, the eyewear frame including a first temple, a second temple, and a lens frame, the lens frame being centrally connected between the first temple and the second temple;
    a first ambient light shield, the first ambient light shield being connected along the first temple;
    a second ambient light shield, the second ambient light shield being connected along the second temple;
    a light-filtering lens assembly configured to optimize the contrasts of the medical images being viewed by the user and maintain activation of rods in the eyes of the user for low light level viewing by the user, the light-filtering lens assembly including a voltage-driven display, the voltage-driven display being a liquid crystal light filter and mounted onto the eyewear frame and being configured to adjust a total transmittance of light and a color of the voltage-driven display based on a voltage provided to the voltage-driven display,
        when the user is in a dark room, the total transmittance of light of the voltage-driven display being adjustable to be within the range of approximately 85-95% transmittance of light and the color of the voltage-driven display being yellow, and
        when the user is in a lighted area or in daylight, the total transmittance of light of the voltage-driven display being adjustable to be within the range of approximately 40-60% transmittance of light and the color of the voltage-driven display being red;
    an electrical system, the electrical system being electrically coupled to the light-filtering lens assembly, the electrical system including:
        a processor;
        a power source; and a potentiometer, the potentiometer being configured to manually adjust the voltage provided to the voltage-driven display; and at least one ambient light sensor, the at least one ambient light sensor being electrically coupled to the electrical system and being configured to automatically adjust the voltage provided to the voltage-driven display.

2. The light-filtering optical eyewear in claim 1, wherein the power source is housed in the eyewear frame and the potentiometer is mounted to the eyewear frame.

3. The light-filtering optical eyewear in claim 1, wherein the lens frame includes a first rim, a second rim, and a bridge, the first rim being connected between the first temple and the bridge, the second rim being connected between the second temple and the bridge, and the bridge being connected between the first rim and the second rim; and the voltage-driven display includes a first display and a second display, the first display being connected to the first rim and the second display being connected to the second rim.

4. The light-filtering optical eyewear in claim 3, wherein a voltage applied to the first display of the voltage-driven display is different from a voltage applied to the second display of the voltage-driven display.

5. The light-filtering optical eyewear in claim 3, wherein the first temple is hingedly connected to the first rim and the second temple is hingedly connected to the second rim.

6. The light-filtering optical eyewear in claim 3, wherein the first ambient light shield is positioned adjacent to the first rim and the second ambient light shield is positioned adjacent to the second rim.

7. The light-filtering optical eyewear in claim 1, further comprising a wireless module to remotely control the potentiometer, the wireless module being housed within the eyewear frame and being electronically coupled to the potentiometer.

8. The light-filtering optical eyewear in claim 1, further comprising a passive filter layer, the passive filter layer being joined to the voltage-driven display.

9. A medical image reviewing system for controlling the intensity and wavelength of light that is perceived by a user to achieve optimal contrasts when viewing medical images, the medical image reviewing system comprising:

at least one medical image displaying monitor, and a light-filtering optical eyewear including:

an eyewear frame, the eyewear frame including a first temple, a second temple, and a lens frame, the lens frame being centrally connected between the first temple and the second temple;

a first ambient light shield, the first ambient light shield being connected along the first temple;

a second ambient light shield, the second ambient light shield being connected along the second temple;

a light-filtering lens assembly configured to optimize the contrasts of the medical images being viewed by the user and maintain activation of rods in the eyes of the user for low light level viewing by the user, the light-filtering lens assembly including a voltage-driven display, the voltage-driven display being a liquid crystal light filter and mounted onto the eyewear frame and being configured to adjust a total transmittance of light and a color of the voltage-driven display based on a voltage provided to the voltage-driven display, when the user is in a dark room, the total transmittance of light of the voltage-driven display being adjustable to be within the range of approximately 85-95% transmittance of light and the color of the voltage-driven display being yellow, and when the user is in a lighted area or in daylight, the total transmittance of light of the voltage-driven display being adjustable to be within the range of approximately 40-60% transmittance of light and the color of the voltage-driven display being red;

an electrical system, the electrical system being electrically coupled to the light-filtering lens assembly, the electrical system including:

a processor;

a power source; and a potentiometer, the potentiometer being configured to manually adjust the voltage provided to the voltage-driven display; and at least one ambient light sensor, the at least one ambient light sensor being electrically coupled to the electrical system and being configured to automatically adjust the voltage provided to the voltage-driven display.

10. The medical image reviewing system in claim 9, wherein the power source is housed in the eyewear frame and the potentiometer is mounted to the eyewear frame.

11. The medical image reviewing system in claim 9, wherein the lens frame includes a first rim, a second rim, and a bridge, the first rim being connected between the first temple and the bridge, the second rim being connected between the second temple and the bridge, and the bridge being connected between the first rim and the second rim; and the voltage-driven display includes a first display and a second display, the first display being connected to the first rim and the second display being connected to the second rim.

12. The medical image reviewing system in claim 11, wherein a voltage applied to the first display of the voltage-driven display is different from a voltage applied to the second display of the voltage-driven display.

13. The medical image reviewing system in claim 11, wherein the first temple is hingedly connected to the first rim and the second temple is hingedly connected to the second rim.

14. The medical image reviewing system in claim 11, wherein the first ambient light shield is positioned adjacent to the first rim and the second ambient light shield is positioned adjacent to the second rim.

15. The medical image reviewing system in claim 9, further comprising a wireless module to remotely control the potentiometer, the wireless module being housed within the eyewear frame and being electronically coupled to the potentiometer.

16. The medical image reviewing system in claim 9, further comprising a passive filter layer, the passive filter layer being joined to the voltage-driven display.

* * * * *